US012649228B1

(12) United States Patent (10) Patent No.: US 12,649,228 B1
Jeong et al. (45) Date of Patent: Jun. 9, 2026

(54) TOOL FOR GAS TURBINE ENGINE MAINTENANCE

(71) Applicant: General Electric Company, Evendale, OH (US)

(72) Inventors: Younkoo Jeong, Clifton Park, NY (US); Zhen Liu, Waterford, NY (US); Andrew Crispin Graham, Badminton (GB); Ambarish Jayant Kulkarni, Glenville, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/976,536

(22) Filed: Dec. 11, 2024

(51) Int. Cl.
B25J 9/10 (2006.01)
B25J 18/06 (2006.01)

(52) U.S. Cl.
CPC ............. B25J 9/104 (2013.01); B25J 9/1045 (2013.01); B25J 18/06 (2013.01)

(58) Field of Classification Search
CPC . B25J 9/104; B25J 9/1045; B25J 9/065; B25J 15/0233; B25J 18/06
See application file for complete search history.

(56) References Cited

U.S. PATENT DOCUMENTS

| | | | |
|---|---|---|---|
| 4,393,728 | A | 7/1983 | Larson |
| 4,751,821 | A | 6/1988 | Birchard |
| 4,848,179 | A | 7/1989 | Ubhayakar |
| 6,408,224 | B1 | 6/2002 | Okamoto |
| 7,033,979 | B2 | 4/2006 | Herwig |
| 7,171,279 | B2 | 1/2007 | Buckingham |
| 7,543,518 | B2 | 6/2009 | Buckingham |
| 7,828,808 | B2 | 11/2010 | Hinman |
| 8,028,936 | B2 | 10/2011 | Mcdermott |
| 8,214,083 | B2 | 7/2012 | Kawai |
| 8,277,647 | B2 | 10/2012 | Rice |

(Continued)

FOREIGN PATENT DOCUMENTS

| | | |
|---|---|---|
| CN | 1533321 | 9/2004 |
| CN | 101237964 | 8/2008 |

(Continued)

OTHER PUBLICATIONS

"Tendons Driven Continuum Robots", Continuum Robotics Laboratory—University of Toronto; https://crl.utm.utoronto.ca/_pages/tdcr.html; 2024, 4 pgs.

(Continued)

*Primary Examiner* — Bobby Rushing, Jr.

(74) *Attorney, Agent, or Firm* — Fitch, Even, Tabin & Flannery LLP

(57) ABSTRACT

In some embodiments, apparatuses and methods are provided herein useful for performing maintenance operations within a gas turbine engine. In some embodiments, a tool performing maintenance operations within a gas turbine engine includes a link assembly; an elongated enclosure having a cavity and an enclosure line guide; a line assembly inserted through the enclosure line guide and is selectively coupled to the tip link of the link assembly; and an actuator apparatus coupled to the link assembly and configured to move the link assembly through the cavity and out of the distal end of the elongated enclosure from a retracted state to an extended state.

20 Claims, 14 Drawing Sheets

(56) References Cited

U.S. PATENT DOCUMENTS

| | | | |
|---|---|---|---|
| 8,721,530 B2 | 5/2014 | Ohline |
| 8,768,509 B2 | 7/2014 | Unsworth |
| 8,826,766 B2 | 9/2014 | Yasuda |
| 8,827,948 B2 | 9/2014 | Romo |
| 8,951,303 B2 | 2/2015 | Dehoff |
| 8,992,421 B2 | 3/2015 | Stand |
| 9,138,782 B2 | 9/2015 | Dorshimer |
| 9,149,929 B2 | 10/2015 | Motzer |
| 9,220,398 B2 | 12/2015 | Woodley |
| 9,282,993 B1 | 3/2016 | Cohen |
| 9,393,000 B2 | 7/2016 | Donhowe |
| 9,604,370 B2 | 3/2017 | Park |
| 9,718,187 B2 | 8/2017 | Ishikawa |
| 9,739,168 B2 | 8/2017 | Ekanayake |
| 9,757,856 B2 | 9/2017 | Oyola |
| 9,926,517 B2 | 3/2018 | Tibbetts |
| 9,932,854 B1 | 4/2018 | Tibbetts |
| 9,951,647 B2 | 4/2018 | Rawson |
| 9,957,066 B2 | 5/2018 | Bewlay |
| 10,005,111 B2 | 6/2018 | Eriksen |
| 10,018,113 B2 | 7/2018 | Bewlay |
| 10,046,461 B2 | 8/2018 | Ekas |
| 10,052,761 B2 | 8/2018 | Langenfeld |
| 10,227,891 B2 | 3/2019 | Eriksen |
| 10,323,539 B2 | 6/2019 | Bewlay |
| 10,377,968 B2 | 8/2019 | Brooks |
| 10,385,723 B2 | 8/2019 | Flynn |
| 10,571,642 B1 | 2/2020 | Cohen |
| 10,618,162 B2 | 4/2020 | Norton |
| 10,634,004 B2 | 4/2020 | Giljohann |
| 10,669,885 B2 | 6/2020 | Pecchiol |
| 10,920,181 B2 | 2/2021 | Martin |
| 10,967,504 B2 | 4/2021 | Simaan |
| 11,027,317 B2 | 6/2021 | Tibbetts |
| 11,103,992 B2 | 8/2021 | Tanaka |
| 11,441,446 B2 | 9/2022 | Rawson |
| 11,458,641 B2 | 10/2022 | Graham |
| 11,613,003 B2 | 3/2023 | Graham |
| 11,679,898 B2 | 6/2023 | Danko |
| 11,692,650 B2 | 7/2023 | Graham |
| 11,752,622 B2 | 9/2023 | Graham |
| 11,787,069 B2 | 10/2023 | Curle |
| 11,834,990 B2 | 12/2023 | Hawke |
| 11,977,217 B2 | 5/2024 | Graham |
| 2005/0107667 A1 | 5/2005 | Danitz |
| 2011/0313568 A1 | 12/2011 | Blackwell |
| 2013/0110289 A1 | 5/2013 | Cho |
| 2013/0165754 A1 | 6/2013 | Frassica |
| 2013/0165908 A1 | 6/2013 | Purdy |
| 2013/0255410 A1 | 10/2013 | Lee |
| 2013/0340559 A1 | 12/2013 | Danitz |
| 2014/0058364 A1 | 2/2014 | Donhowe |
| 2014/0090506 A1 | 4/2014 | Tobey |
| 2014/0260755 A1 | 9/2014 | Dong |
| 2014/0276956 A1 | 9/2014 | Crainich |
| 2015/0122071 A1 | 5/2015 | Lee |
| 2015/0159122 A1 | 6/2015 | Tibbetts |
| 2015/0265438 A1 | 9/2015 | Hossainy |
| 2015/0283699 A1 | 10/2015 | Morin |
| 2015/0283710 A1 | 10/2015 | Schrader |
| 2015/0313619 A1 | 11/2015 | Tadano |
| 2015/0321427 A1 | 11/2015 | Gunnarsson |
| 2015/0352584 A1 | 12/2015 | Franz |
| 2016/0001444 A1 | 1/2016 | Kwok |
| 2016/0008990 A1 | 1/2016 | Franz |
| 2016/0016319 A1 | 1/2016 | Remirez |
| 2016/0046018 A1 | 2/2016 | Robertson |
| 2016/0052129 A1 | 2/2016 | Ekas |
| 2016/0052131 A1 | 2/2016 | Lessing |
| 2016/0279789 A1 | 9/2016 | Axinte |
| 2017/0014998 A1 | 1/2017 | Langenfeld |
| 2017/0165721 A1 | 6/2017 | Tibbetts |
| 2017/0167290 A1 | 6/2017 | Kulkarni |
| 2017/0191376 A1 | 7/2017 | Eriksen |
| 2017/0204739 A1 | 7/2017 | Rawson |
| 2017/0210015 A1 | 7/2017 | Jogasaki |
| 2017/0254217 A1 | 9/2017 | Eriksen |
| 2018/0149038 A1 | 5/2018 | Eriksen |
| 2018/0155060 A1 | 6/2018 | Dauenhauer |
| 2018/0214220 A1 | 8/2018 | Kan |
| 2018/0216036 A1 | 8/2018 | Tibbetts |
| 2018/0237163 A1 | 8/2018 | Bewlay |
| 2018/0242958 A1 | 8/2018 | Dayton |
| 2018/0243900 A1 | 8/2018 | Tanaka |
| 2018/0245477 A1 | 8/2018 | Kulkarni |
| 2018/0258787 A1 | 9/2018 | Tibbetts |
| 2018/0291803 A1 | 10/2018 | Belay |
| 2018/0298781 A1 | 10/2018 | Tibbetts |
| 2018/0313225 A1 | 11/2018 | Millhaem |
| 2018/0355751 A1 | 12/2018 | Tibbetts |
| 2019/0015978 A1 | 1/2019 | Takagi |
| 2019/0126497 A1 | 5/2019 | Onal |
| 2019/0153890 A1 | 5/2019 | Eriksen |
| 2019/0196449 A1 | 6/2019 | Zhang |
| 2019/0323378 A1 | 10/2019 | Tibbetts |
| 2019/0358833 A1 | 11/2019 | Graham |
| 2019/0366536 A1 | 12/2019 | Graham |
| 2019/0383158 A1 | 12/2019 | Diwinsky |
| 2020/0046209 A1 | 2/2020 | Fancher |
| 2020/0114505 A1 | 4/2020 | Kikuchi |
| 2020/0114528 A1 | 4/2020 | Graham |
| 2020/0189095 A1 | 6/2020 | Manfredi |
| 2020/0315424 A1 | 10/2020 | Graham |
| 2021/0108537 A1 | 4/2021 | Rigg |
| 2021/0317752 A1 | 10/2021 | Deja |
| 2021/0388737 A1 | 12/2021 | Foxall |
| 2022/0176524 A1 | 6/2022 | Graham |
| 2022/0221706 A1 | 7/2022 | Trivedi |
| 2022/0410411 A1 | 12/2022 | Graham |
| 2023/0194234 A1 | 6/2023 | Graham |

FOREIGN PATENT DOCUMENTS

| | | | |
|---|---|---|---|
| CN | 206840080 | 1/2018 | |
| DE | 102013202616 A1 | 8/2014 | |
| DE | 102015006330 | 11/2016 | |
| WO | 2010040215 | 4/2010 | |
| WO | 2012037598 | 3/2012 | |
| WO | 2013078529 | 6/2013 | |
| WO | 2017193013 | 11/2017 | |
| WO | 2020022474 A1 | 1/2020 | |
| WO | 2020030516 A1 | 2/2020 | |
| WO | WO-2023194786 A1 * | 10/2023 | ............ B25J 9/1625 |

OTHER PUBLICATIONS

Gendreau Dominique et al, "3D-Printing: A promising technology to design three-dimensional microsystems", 2016 International Conference on Manipulation, Automation and Robotics at Small Scales (MARSS), IEEE, (Jul. 18, 2016), doi:10.1109/MARSS.2016.7561724, pp. 1-5, XP032957756.

Krieger Yannick S et al, "Multi-arm snake-like robot", 2017 IEEE International Conference on Robotics and Automation (ICRA), IEEE, (May 29, 2017), doi:10.1109/ICRA.2017.7989290, pp. 2490-2495, XP033127032.

Roppenecker et al, "Multi arm snake-like robot kinematics", 2013 IEEE/RJS International Conference on Intelligent Robots and Systems, IEEE, Nov. 3, 2013, pp. 5040-5045.

Saari et al, "Fiber Encapsulation Additive Manufacturing: An Enabling Technology for 3D Printing of Electromechanical Devices and Robotic Components", 3D Printing and Additive Manufacturing, vol. 2, No. 1, Mar. 2015, pp. 32-39.

U.S. Appl. No. 15/986,978; Advisory Action mailed Nov. 19, 2021; (5 pages).

U.S. Appl. No. 15/986,978; Notice of Allowance and Fees Due (PTOL-85) mailed Jun. 1, 2022; (12 pages).

U.S. Appl. No. 15/986,978; Notice of Allowance and Fees Due (PTOL-85) mailed Jun. 15, 2022; (3 pages).

U.S. Appl. No. 15/986,978; Office Action mailed Feb. 3, 2022; (23 pages).

(56)  References Cited

OTHER PUBLICATIONS

U.S. Appl. No. 15/986,978; Office Action mailed May 25, 2021; (20 pages).
U.S. Appl. No. 15/986,978; Office Action mailed Aug. 18, 2020; (17 pages).
U.S. Appl. No. 15/986,978; Office Action mailed Aug. 30, 2021; (24 pages).
U.S. Appl. No. 15/986,978; Office Action mailed Dec. 8, 2020; (24 pages).
U.S. Appl. No. 17/903,722; Final Rejection mailed Sep. 12, 2024; (pp. 1-17).
U.S. Appl. No. 17/903,722; Final Rejection mailed Sep. 22, 2023; (pp. 1-27).
U.S. Appl. No. 17/903,722; Non-Final Rejection mailed Feb. 5, 2024; (pp. 1-21).
U.S. Appl. No. 17/903,722; Non-Final Rejection mailed May 17, 2024; (pp. 1-16).
U.S. Appl. No. 17/903,722; Non-Final Rejection mailed Jun. 16, 2023; (pp. 1-22).

* cited by examiner

*500*

200N Inline
Load Cell

70:1 Gear
Motor

Ball Bearing
With Mount

Drive Pulley
(6.5mm ID)

Load Cell
Guide

Arm
Adaptor/Receiver

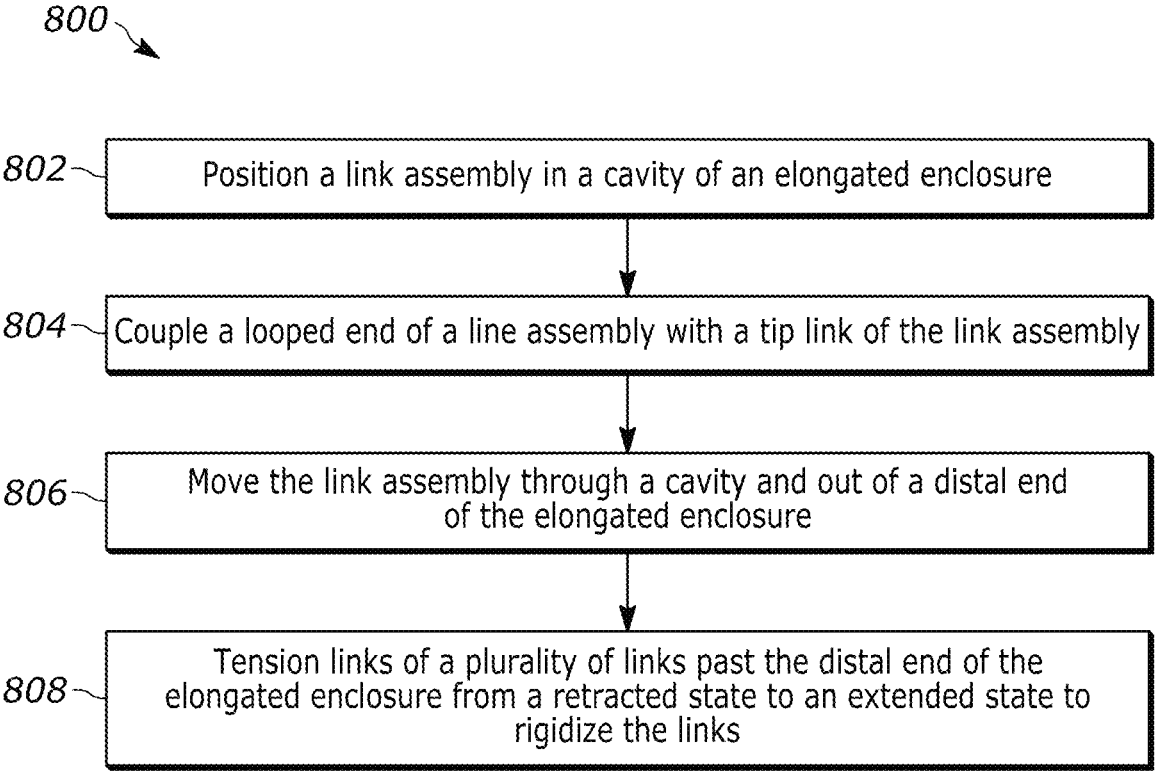

800

802 — Position a link assembly in a cavity of an elongated enclosure

804 — Couple a looped end of a line assembly with a tip link of the link assembly 806 — Move the link assembly through a cavity and out of a distal end of the elongated enclosure 808 — Tension links of a plurality of links past the distal end of the elongated enclosure from a retracted state to an extended state to rigidize the links

FIG. 8

TOOL FOR GAS TURBINE ENGINE MAINTENANCE

TECHNICAL FIELD

This disclosure relates generally to a tool for performing maintenance or other operations including component inspections within an environment.

BACKGROUND

Many aircraft engines include, in serial flow arrangement, a compressor section including a low pressure compressor and a high pressure compressor for compressing air flowing through the aircraft engine, a combustor for mixing fuel with the compressed air such that the mixture may be ignited, and a turbine section including a high pressure turbine and a low pressure turbine for providing power to the compressor section.

Within one or more of the sections, aircraft engines define an annular opening. Tools are inserted through this opening to perform maintenance operations including the inspection and/or repair of internal engine components. These annular openings may vary in size and shape, such that different dedicated, specialized tools must be utilized with different openings.

BRIEF DESCRIPTION OF DRAWINGS

Disclosed herein are embodiments of systems, apparatuses and methods pertaining to a tool for inspecting, repairing, or both a component within a gas turbine engine. This description includes drawings, wherein:

FIG. 8 shows a flow diagram of an exemplary method for performing maintenance operations on a component within a gas turbine engine;

Figure 1:
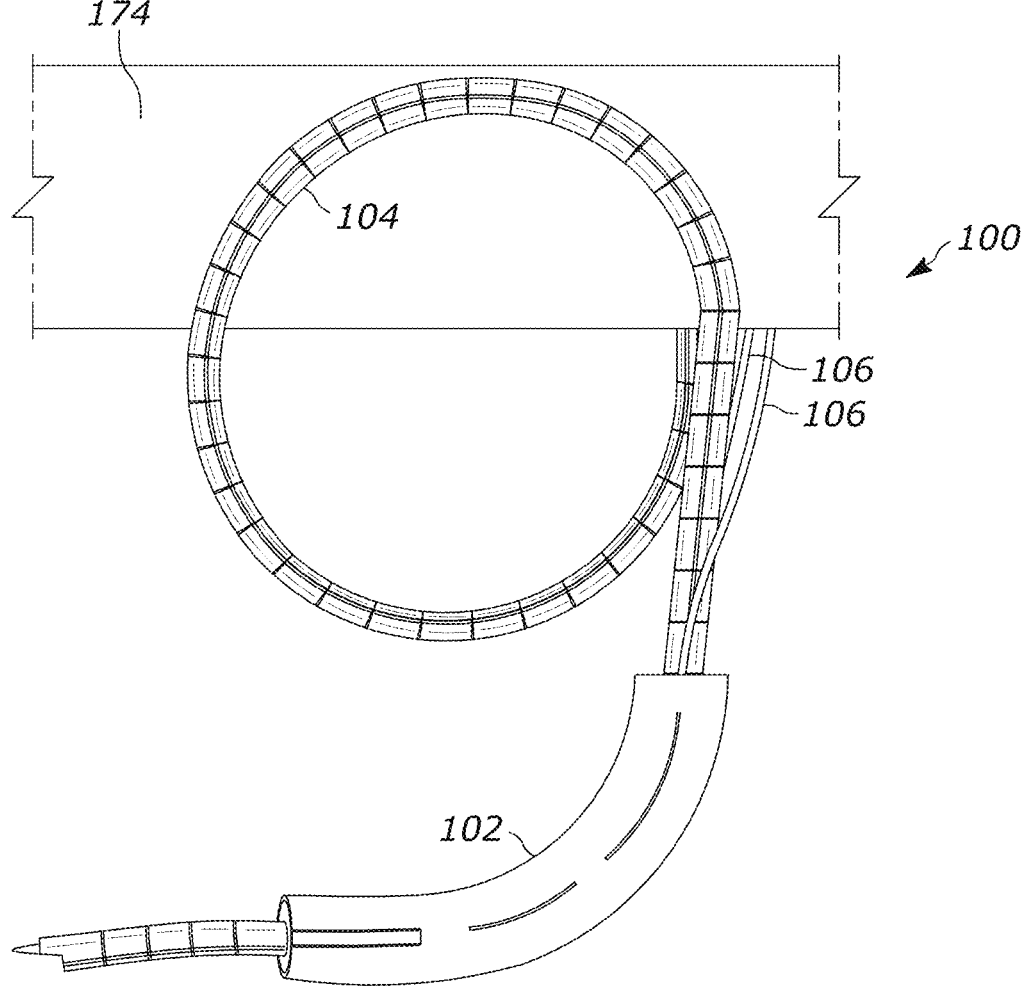
FIG. 1 shows an exemplary tool in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, approaches are provided for the precise control of the ends of a tool for performing maintenance operations in aircraft engines (e.g., manually and/or as robotic arms) and other confined spaces or environments. The tool described herein includes a link assembly having a plurality of links disposed in an elongated enclosure. Tension is applied only to the links of the link assembly that are outside of the elongated enclosure to form them into inspection, repair, and/or maintenance shape. The links of the link assembly that are inside the elongated enclosure are not tensioned and remain flexible. The decoupling between two sections of the link assembly (e.g., those links that are inside the elongated enclosure versus those links that are outside of the elongated enclosure) is achieved by tensioning mechanism inside the elongated enclosure as described herein. In this mechanism, the links inside the elongated enclosure do not have a line assembly inserted into the link line guides of these links (that is, these links are tension free). Instead, the line assembly used for tensioning and/or shaping the link assembly are routed through an enclosure line guide of the elongated enclosure and are loaded into each link at the exit of the elongated enclosure as additional links are inserted into the elongated enclosure.

There are a number of advantages provided by the embodiments of the tool disclosed herein. For example, because only the links outside of the elongated enclosure are tensioned, the required total tension can be adjusted to be minimum, calculated for example by using a free body diagram or a shear force and bending moment diagram, considering the number of links outside of the elongated enclosure to compensate for the friction force between the line assembly and link and the pose of the arm in order to compensate the static load (weight) from the links outside of the elongated enclosure. This improves the repeatability of the shape of the arm (link assembly outside of the elongated enclosure). Another advantage is that the small form factor of the elongated enclosure lends the tool to have increased useability and reduced maintenance operation (e.g., inspection and/or repair) burden. In some embodiments, another advantage is that tension-free links in the elongated enclosure can make the link assembly compatible with a 3-dimensional elongated enclosure design, which can be used to deploy the link assembly for out-of-plane maintenance operation. Thus, decoupling between the two sections of the link assembly (those links inside and those links outside the elongated enclosure) allows for precisely controlled tensioning of the link assembly during maintenance operations.

Pursuant to various embodiments, systems, apparatuses, and methods are provided herein useful for performing maintenance operations within a gas turbine engine. In some embodiments, a tool for performing maintenance operations within a gas turbine engine includes a link assembly including a plurality of links sequentially coupled together and having a tip link at one end, where each of the plurality of links is formed with a link line guide that is configured to receive a line assembly; an elongated enclosure having a cavity and an enclosure line guide, the link assembly being disposed within the cavity, the enclosure line guide including a distal section with a distal opening and a proximal section with a proximal opening; a line assembly inserted through the enclosure line guide and is selectively coupled to the tip link of the link assembly, wherein the line assembly when coupled to the tip link is operated to cause tensioning of links of the plurality of links past a distal end of the elongated enclosure to rigidize the link assembly; and an actuator apparatus coupled to the link assembly and configured to move the link assembly through the cavity and out of the distal end of the elongated enclosure from a retracted state to an extended state, wherein when in the retracted state, the line assembly is disposed outside the link line guide of at least one link of the plurality of links, and wherein when in the extended state, the at least one link of the plurality of links is disposed outside of the elongated enclosure and the line assembly is inserted within the link line guide of the at least one link.

In some embodiments, a method for performing maintenance operations on a component within a gas turbine engine includes positioning a link assembly in a cavity of an elongated enclosure, the link assembly being a plurality of links sequentially coupled together and having a tip link at one end, where each of the plurality of links is formed with a link line guide that is configured to receive a line assembly; coupling an end of the line assembly with the tip link of the link assembly, the line assembly partially disposed through an enclosure line guide of the elongated enclosure; moving, by an actuator apparatus coupled to the link assembly, the link assembly through the cavity and out of a distal end of the elongated enclosure; and tensioning, by the actuator apparatus, the line assembly in order to compress the plurality of links deployed beyond the distal end of the elongated enclosure from a retracted state to an extended state to rigidize the links, where in the retracted state, the line assembly is disposed outside the link line guide of at least one link of the plurality of links, and where in the extended state, the at least one link of the plurality of links is disposed outside of the elongated enclosure and the line assembly is inserted within the link line guide of the at least one link.

The following description is not to be taken in a limiting sense, but is made merely for the purpose of describing the general principles of exemplary embodiments. Reference throughout this specification to "one embodiment," "an embodiment," "some embodiments," "an implementation," "some implementations," "some applications," or similar language means that a particular feature, structure, or characteristic described in connection with the embodiment is included in at least one embodiment of this disclosure. Thus, appearances of the phrases "in one embodiment," "in an embodiment," "in some embodiments," "in some implementations," and similar language throughout this specification may, but do not necessarily, all refer to the same embodiment.

FIG. 1 shows an exemplary tool 100 in accordance with some embodiments. In an illustrative non-limiting example, the tool 100 is mounted on a support 174. The tool 100 includes an elongated enclosure 102, a link assembly 104, and/or a line assembly 106. A link assembly (also known as a snake arm robot if used as robotic arm) is inserted into an elongated enclosure such as a tube, for example. The elongated enclosure 102 is used to guide the positioning of the link assembly 104 within an engine after the link assembly 104 is inserted into the engine. In one embodiment, the elongated enclosure 102 may be made of two half-portions of any substantially rigid material for example without limitation a metal alloy, a composite, a polymer, etc., secured together with screws to form the elongated enclosure 102. Each half-portion forms an indention on one side that when combined forms a cavity of the elongated enclosure 102 where the link assembly 104 is received. In other embodiments, the elongated enclosure 102 may be made of a single piece. In other embodiments, the elongated enclosure 102 may be made of two or more pieces. In other embodiments, the elongated enclosure 102 may be made by hydroforming a metallic tube in a mold, or by 3D additive manufacture, or by machining, or by injection molding or by any other suitable method capable of forming the necessary features described herein.

In an illustrative non-limiting example, the tool 100 may be inserted into a confined space of an engine. The tool 100 may include a link assembly (e.g., the link assembly 104 shown in FIG. 2B). The link assembly may be fed into a proximal end of the tool 100 (e.g., the proximal end 134 of the elongated enclosure 102 shown in FIG. 2C) and pushed out of a distal end of the tool 100 (e.g., the distal end 148 of the elongated enclosure 102 shown in FIG. 2C) from a retracted state to an extended state. In some embodiments, tension may be applied to those links of the link assembly that are pushed out of the tool 100 and have a line assembly (e.g., the line assembly 106 shown in FIG. 2B) within their link line guides (e.g., the link line guide 128 shown in FIG. 3A). In some embodiments, the applied tension may move those links into a rigidized state or shape. In some embodiments, those links of the link assembly that are still inside the tool 100 do not have the line assembly inside their link line guides, and are still flexible and not in a rigidized state or shape. Because only the links outside of the elongated enclosure are tensioned, the required total tension may be adjusted to be minimum. This improves the repeatability of the shape of the portion of the link assembly outside of the tool 100. Another advantage is that the small form factor of the tool 100 may increase useability and reduce maintenance operation burden. In some embodiments, another advantage is that tension-free links in the tool 100 can make the link assembly compatible with a 3-dimensional elongated enclosure design, which can be used to deploy the link assembly for out-of-plane maintenance operation. Thus, decoupling between the two sections of the link assembly (those links inside and those links outside the tool 100) allows for precisely controlled tensioning of the link assembly during maintenance operations.

Figures 2A, 2B:
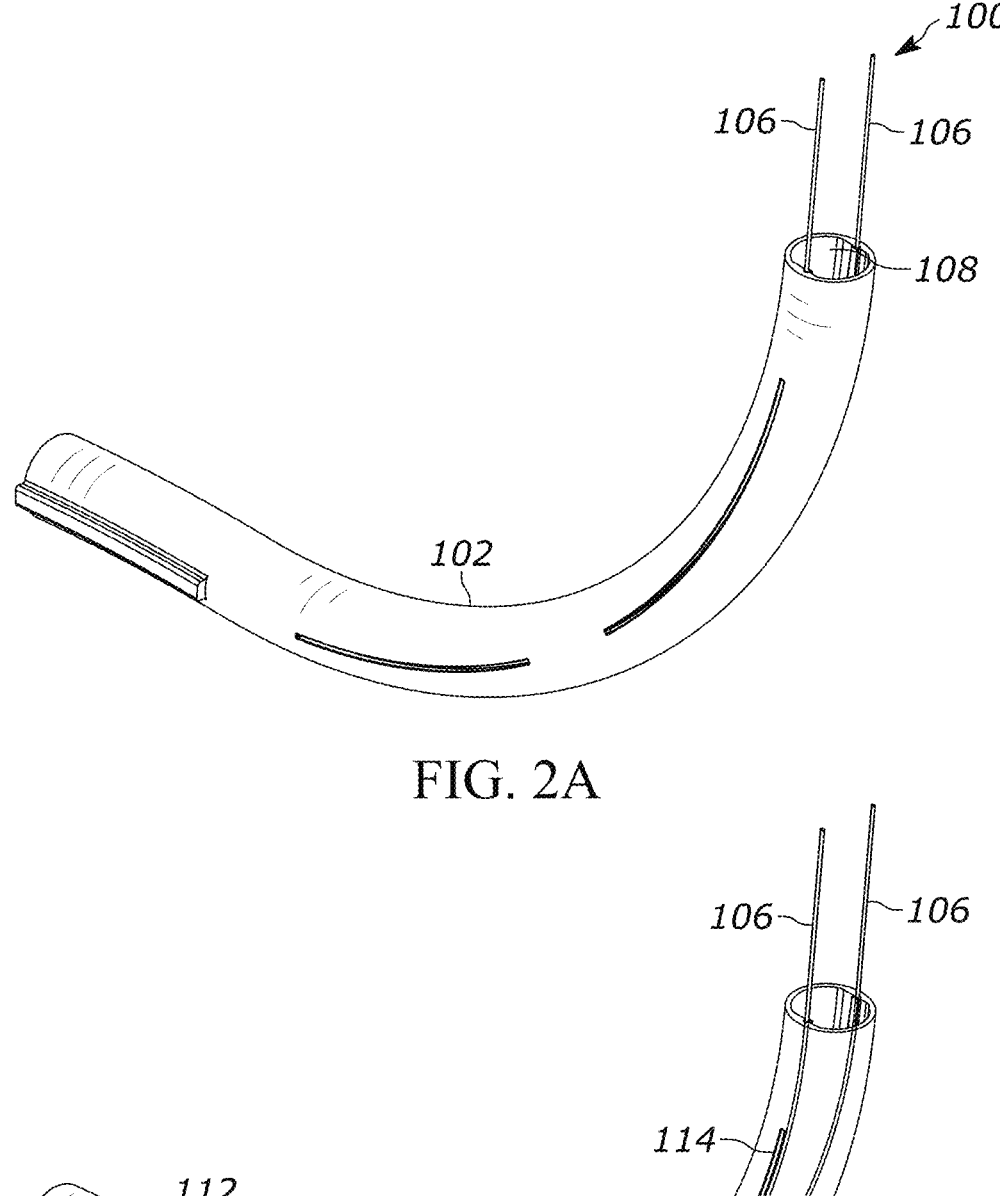
FIG. 2A shows another exemplary tool in accordance with some embodiments.
FIG. 2B shows a plurality of links disposed inside the elongated enclosure of FIG. 2A.

FIG. 2A shows an exemplary tool 100 in accordance with some embodiments. FIG. 2B shows a plurality of links disposed inside the elongated enclosure 102 of FIG. 2A in accordance with some embodiments. In FIG. 2A, the elongated enclosure 102 is a curved tube shape having a cavity 108 to receive the link assembly 104. In some embodiments, the elongated enclosure 102 may have a predefined curvature to navigate a certain confined space of a gas turbine engine. In aspects, the elongated enclosure 102 may be made of any substantially rigid material for example without limitation a metal alloy, a composite, a polymer, etc., to name a few. In some embodiments, the line assembly 106 maybe set in place when the elongated enclosure 102 is formed. In some embodiments, the line assembly 106 may be routed through an enclosure line guide 114 of the elongated enclosure 102 when formed. As shown in FIG. 2B, the line assembly 106 may include a looped end 112. For example, line assembly 106 may be a wire and/or cable shaped into a U-shape where at the U-end portion (that is, the looped end 112) of the line assembly 106 is a loop portion that enables a single wire to perform the function of two wires, one length on each side of the elongated enclosure without requiring additional termination features. In some embodiments, each of the open ended ends of the line assembly 106 may be coupled to a spool wheel including a spool of wire and/or cable configured to provide a length of line assembly 106 needed to perform a maintenance operation. Maintenance operations may include any combination of inspecting, repairing, treating, preventatively maintaining and restoratively maintaining components of the engine.

Figure 2C:
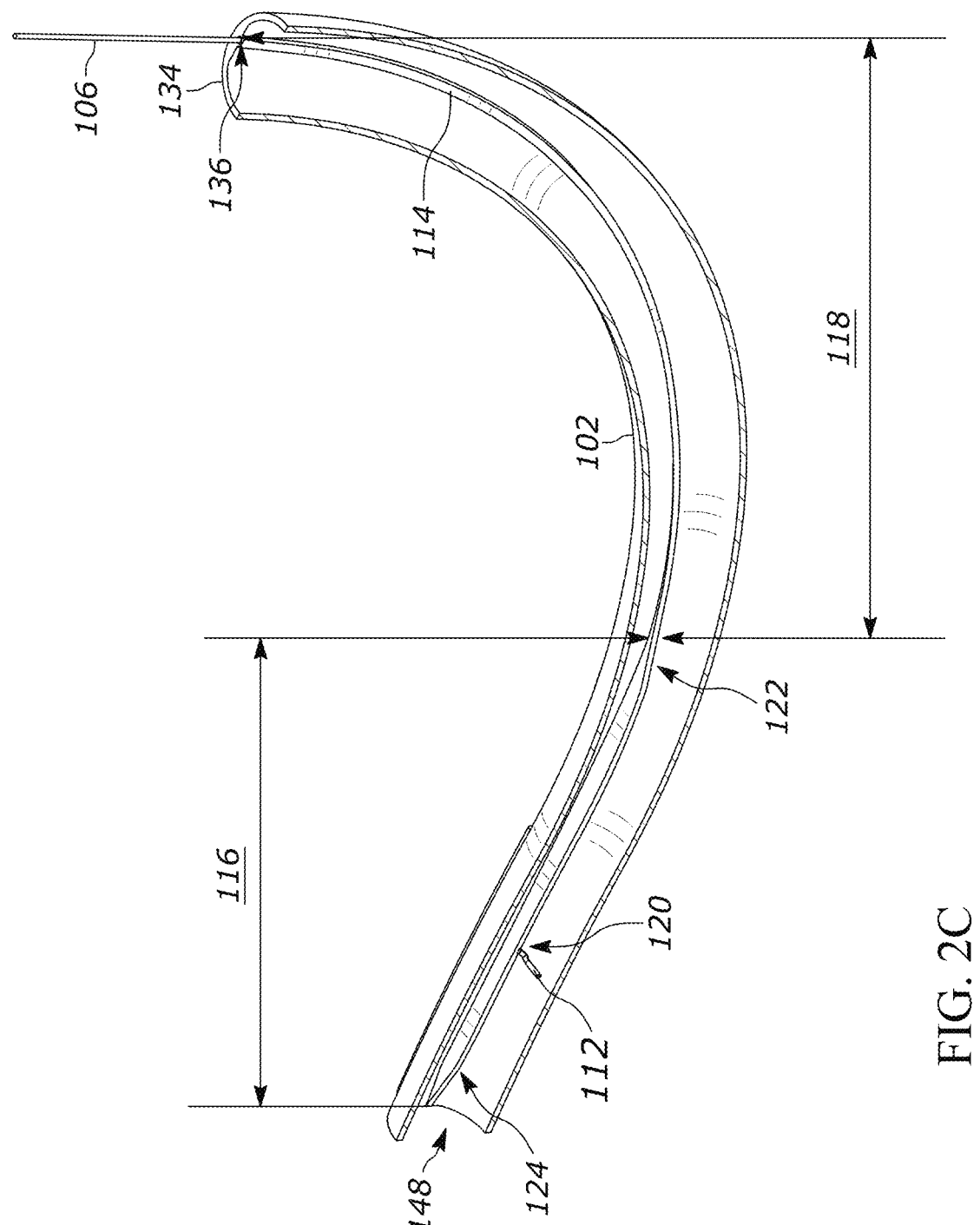
FIG. 2C shows a cross-section of the tool of FIG. 2A without the link assembly in accordance with some embodiments.

FIG. 2C shows a cross-section of the tool 100 of FIG. 2A without the link assembly 104 in accordance with some embodiments. The elongated enclosure 102 forms an enclosure line guide 114. In some embodiments, the enclosure line guide 114 maybe formed along the axial length of each opposite side of the inner side wall of the elongated enclosure 102. The enclosure line guide 114 includes a distal section 116 with a distal opening 120 and a proximal section 118 with a proximal opening 136. As shown in FIG. 2C, the line assembly 106 is disposed inside the enclosure line guide 114 of the elongated enclosure 102. In some embodiments, the enclosure line guide 114 of the elongated enclosure 102 forms a ridge protruding into the cavity 108 of the elongated enclosure 102. At a first location 122 of the enclosure line guide 114, the ridge is sized and shaped to open at least one line guide lid 126 (shown in FIG. 2B and also in FIGS. 3A-3B) of each link of the link assembly 104 to allow insertion of the line assembly 106 into each link line guide 128 (shown in FIG. 2B and also in FIGS. 3A-3C) of the link as the link is moved out of the elongated enclosure 102. At a second location 124 of the enclosure line guide 114, the ridge is sized and shaped to open at least one line guide lid 126 of each link of the link assembly 104 to allow extraction of the line assembly 106 out of the link line guide 128 as the link is pulled into the elongated enclosure 102. In other embodiments, no guide lid 126 is provided and the shapes of the respective line guides 114 and 128 operate to transfer the wire between them as the link assembly passes through the elongated enclosure.

Figure 9:
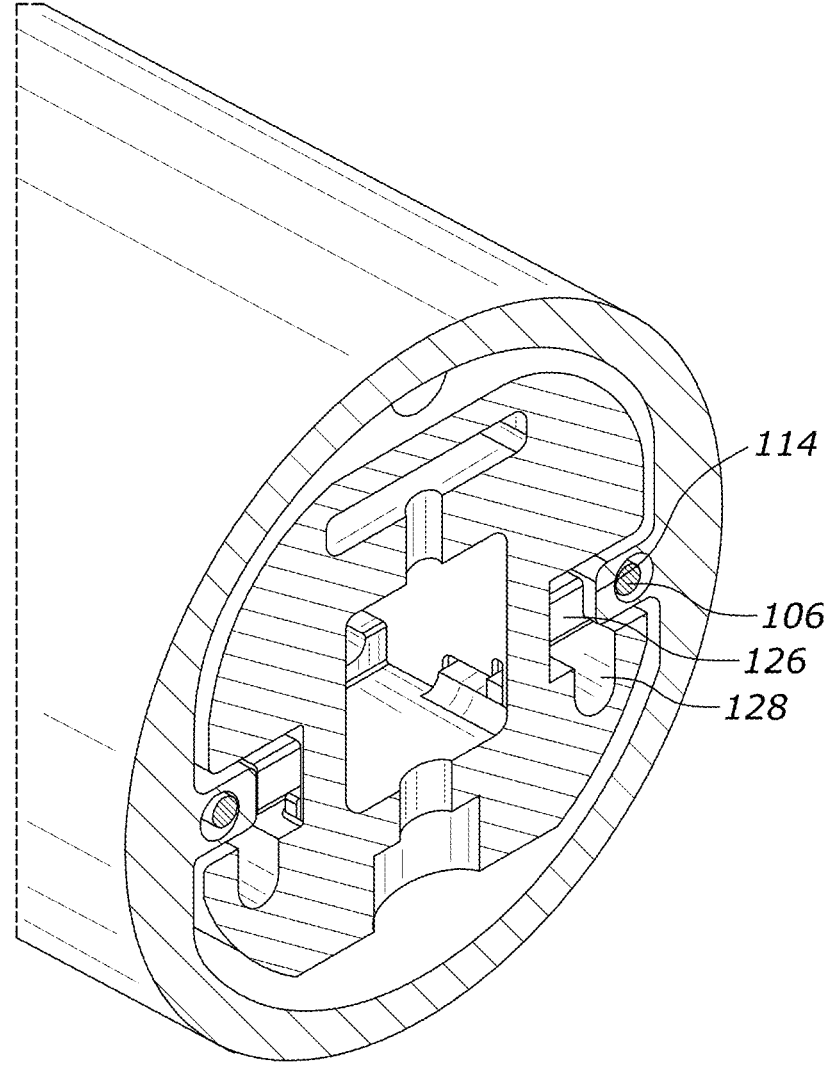
FIG. 9 shows a cross section of a link at a time when the link assembly couples to and/or contacts a first location of the enclosure line guide in accordance with some embodiments.
Figure 10:
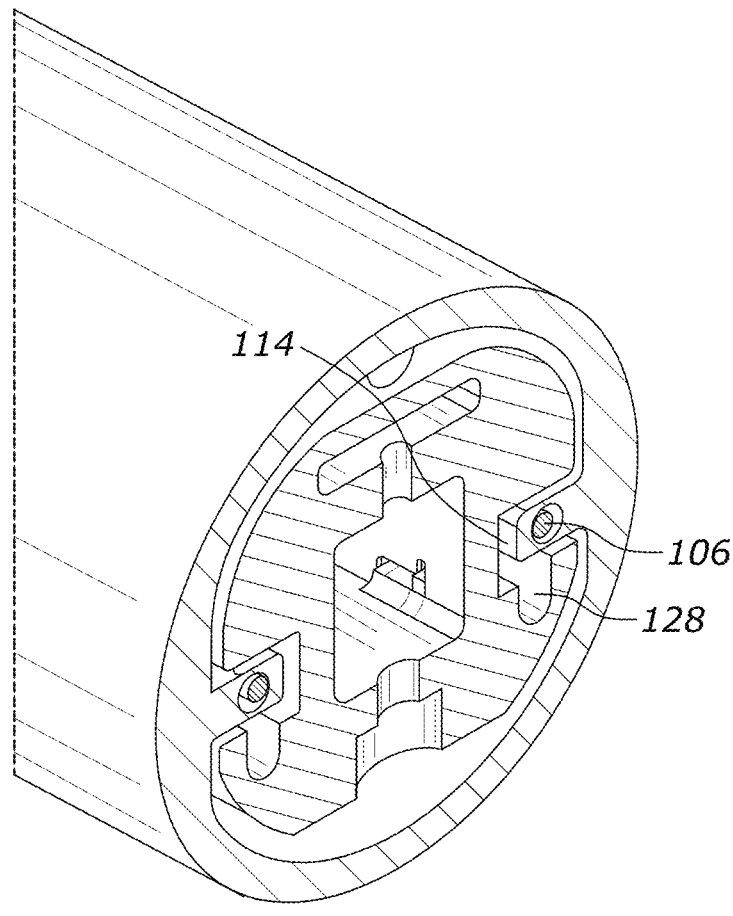
FIG. 10 shows a cross section of a link at a time when the enclosure line guide pushes a line guide lid of the link inward making the link line guide available for an insertion of the line assembly in accordance with some embodiments.
Figure 11:
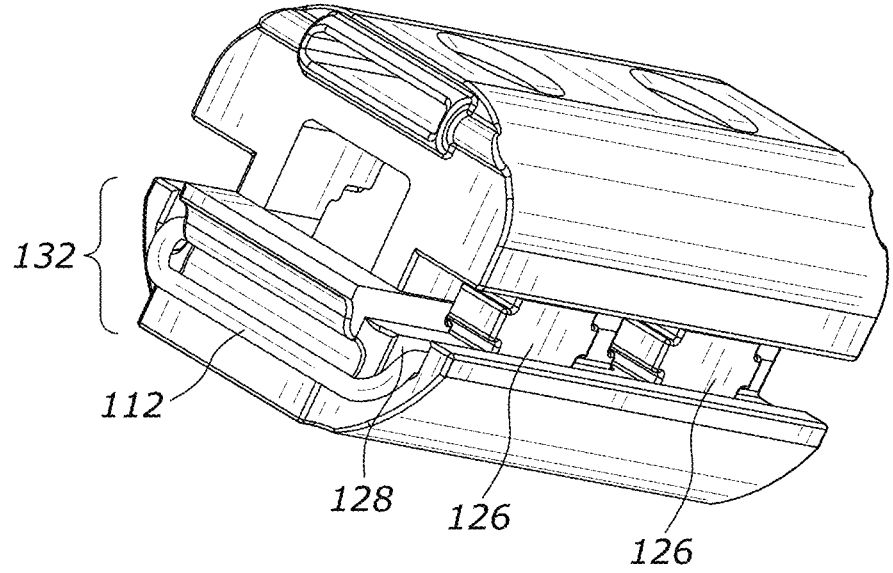
FIG. 11 shows a perspective view of a tip link at a time when a groove end of the tip link contacts a looped end of the line assembly.

Operation of the Link Assembly Moving Out or Pushed Out of the Elongated Enclosure In some embodiments, while the link assembly 104 is positioned within the elongated enclosure 102 and moving towards the distal end 148 of the elongated enclosure 102, the tip link 130 (shown in FIG. 2B) of the link assembly 104 couples to and/or contacts the first location 122 of the enclosure line guide (as shown in FIG. 9), where the ridge pushes at least one line guide lid 126 of the tip link 130 inward forcing the link line guide 128 open and/or allowing the link line guide 128 available for insertion of the line assembly 106 (as shown in FIG. 10). Each of the line guide lids 126 of the subsequent links of the plurality of links of the link assembly 104 is similarly pushed inward by the ridge to hold the corresponding link line guides 128 open as the links pass through the distal end 148 of the elongated enclosure 102. At a distal section 116 of the enclosure line guide 114 is a distal opening 120 where the looped end 112 of the line assembly 106 protrudes out of the enclosure line guide 114. A groove end 132 of the tip link is formed such that when the groove end 132 of the tip link 130 couples and/or contacts the looped end 112 of the line assembly 106, the line assembly 106 is pushed downward causing the line assembly 106 to drop or be inserted into the exposed link line guides 128 of the tip link 130 (as shown in FIG. 11) and subsequent links that are held open by the ridge. In some embodiments, when the tip link 130 reaches the second location 124 of the enclosure line guide 114 where the ridge is tapered off such that the ridge is no longer coupled to or in contact with the line guide lid 126 of the tip link 130, the line guide lid 126 springs back outward closing off the opening to the link line guide 128 of the tip link 130 and securing the line assembly 106 inside the link line guide 128 of the tip link 130 as the tip link 130 is pushed out of the elongated enclosure 102. Similarly, when the subsequent links reaches the second location 124 of the enclosure line guide where the ridge is tapered off such that the ridge is no longer coupled to or in contact with the line guide lids 126 of the subsequent links, the line guide lids 126 spring back outward closing off the opening to the link line guides 128 of the subsequent links and securing the line assembly 106 inside the link line guides 128 of the subsequent links as the subsequent links are pushed out of the elongated assembly. It will be appreciated by an ordinary person skilled in the art, however, that the guide lid 126 does not normally act on the wire(s), when the link assembly is deployed in a shape such as that shown in FIG. 1. The line guide lids serve to secure the links to each other by retaining the wire(s) within the link line guides in the event of a failure such as any failure which causes line tension to be lost. In other embodiments, therefore, in normal operation the tension in the wire(s) serves to hold the links serially in compression with adjacent links(s) and the curvature of the link assembly forms the link line guides into a curve which serves to support and shape the wire(s) along a path defined by the link line guides, in the deployed section of the link assembly.

Operation of the Link Assembly Moving In or Being Pulled Into the Elongated Enclosure In some embodiments, while a link of the link assembly 104 is being pulled through the elongated enclosure 102 (that is, the link assembly 104 is moved back into the distal end 148), the link couples to and/or contacts the second location 124 of the enclosure line guide 114, where the ridge pushes at least one line guide lid 126 of the link inward exposing the link line guide 128 open. Each of the line guide lids 126 of the subsequent links is similarly pushed inward by the ridge to hold the corresponding link line guides 128 open as the links pass through the distal end 148 of the elongated enclosure 102 heading towards the proximal section 118 of the enclosure line guide 114. In some embodiments, the second location 124 of the enclosure line guide 114 may correspond to a location of the ridge that is tapered towards the distal end 148 of the elongated enclosure 102 to open the line guide lid 126 of the link passing through distal end 148 when the link assembly 104 is retracted to decouple the line assembly 104 from the link.

At the distal opening 120 of the distal section 116 of the enclosure line guide 114, the line assembly 106 is extracted out or lifted out of the link line guide 128 of each link that passes the distal opening 120 of the distal section 116 of the enclosure line guide 114. In some embodiments, when each of the links reaches the first location 122 of the enclosure line guide 114 where the ridge tapers off such that the ridge is no longer coupled to or in contact with the corresponding line guide lid 126 of each link, the line guide lid 126 springs back outward closing off the opening to the link line guide 128 as each link is further pulled through the elongated enclosure 102 towards the proximal end 134 of the elongated enclosure 102.

Similarly, when the tip link 130 is pulled into the elongated enclosure 102, the tip link 130 couples to and/or contacts the second location 124 of the enclosure line guide 114, where the ridge pushes at least one line guide lid 126 of the tip link inward exposing the link line guide 128 open. The ridge holds the link line guide 128 open as the tip link 130 passes through the distal end 148 of the elongated enclosure 102 heading towards the proximal section 118 of the enclosure line guide 114. At the distal opening 120 of the distal section 116 of the enclosure line guide 114, the line assembly 106 is extracted out or lifted out of the link line guide 128 of the tip link 130 causing the looped end 112 of the line assembly 106 to be released by the groove end 132 of the tip link 130, thereby, completely disengaging the line assembly 106 from the link assembly 104. In some embodiments, when the tip link 130 reaches the first location 122 of the enclosure line guide 114 where the ridge tapers off such that the ridge is no longer coupled to or in contact with the line guide lid 126 to the tip link 130, the line guide lid 126 springs back outward closing off the opening to the link line guide 128 as the tip link 130 is further pulled through the elongated enclosure 102 towards the proximal end 134 of the elongated enclosure 102.

Examples of Links

Figure 3A:
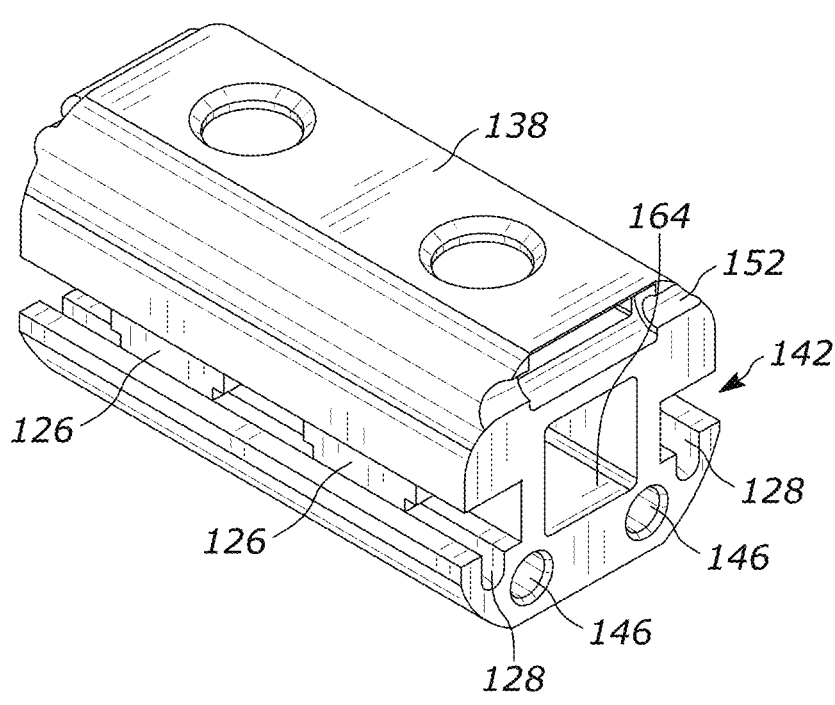
FIG. 3A shows a perspective view at one end of an exemplary link of a link assembly in accordance with some embodiments.
Figure 3B:
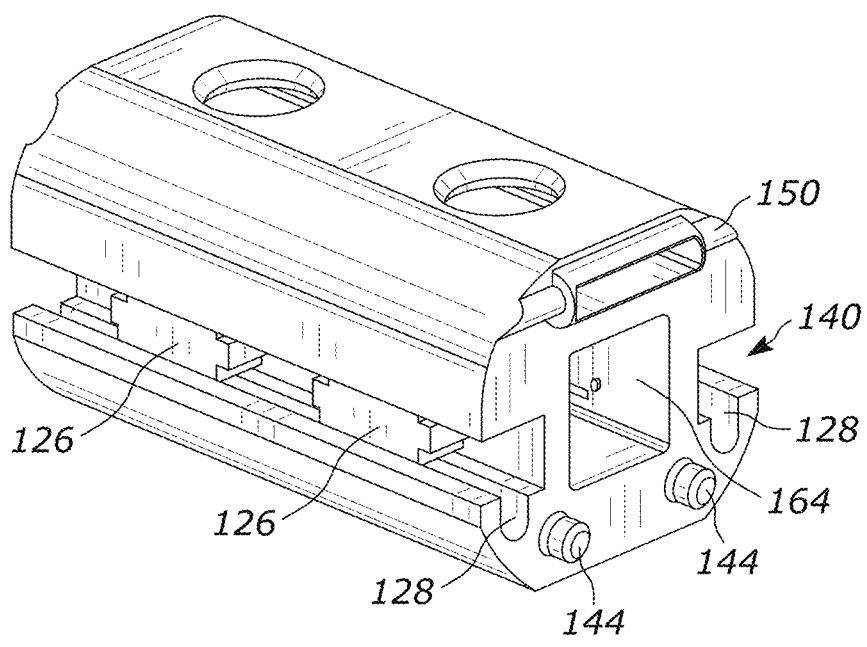
FIG. 3B shows a perspective view of another end of the link of FIG. 3A in accordance with some embodiments.
Figure 3C:
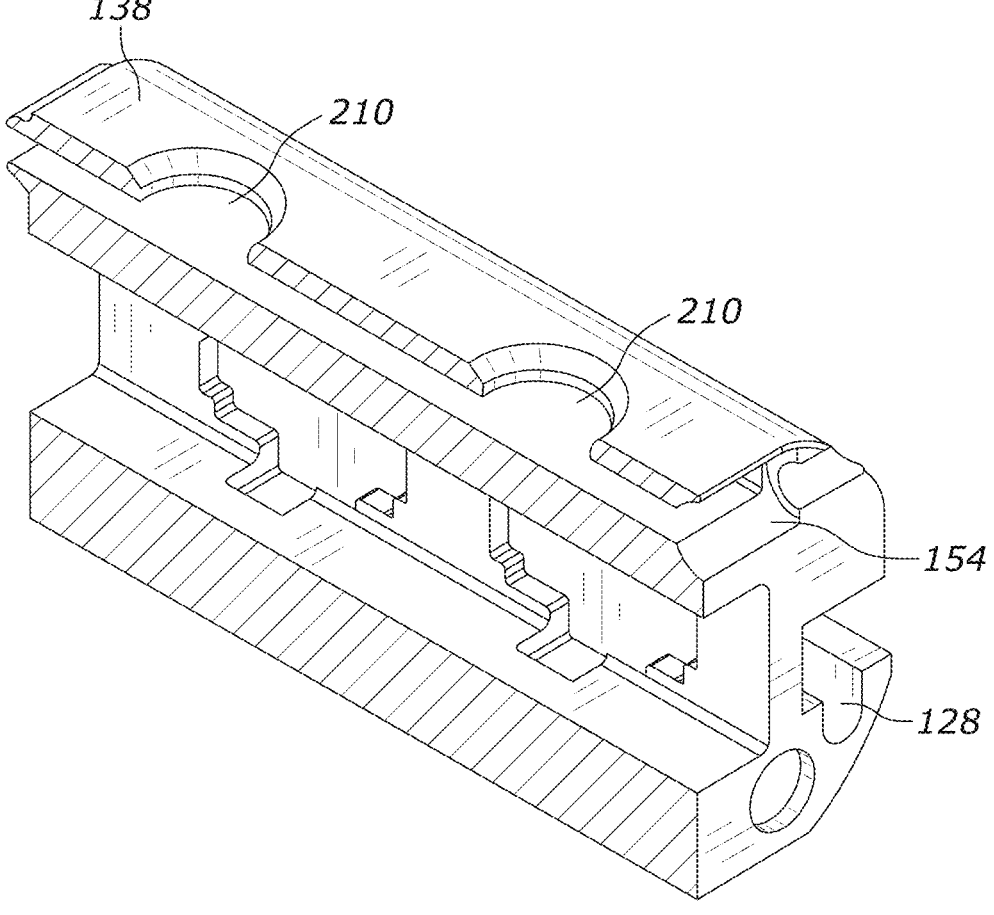
FIG. 3C shows a cross-sectional view of the link of FIG. 3A in accordance with some embodiments.

FIGS. 3A-3B show an exemplary link of a link assembly. FIG. 3A shows a perspective view at one end of an exemplary link of a link assembly in accordance with some embodiments. FIG. 3B shows a perspective view of an opposite end of the link of FIG. 3A in accordance with some embodiments. The link assembly 104 includes a plurality of links 138. Each link 138 in the link assembly 104 includes at least one link line guide 128 and at least one line guide lid 126. In some embodiments, as shown in FIGS. 3A-3C, a link 138 includes a link line guide 128 and two line guide lids 126 on each side of the link. For example, the link line guide 128 may be an open channel that runs across the axial length of the link 138. One or more portions of the link line guide 128 may be covered by the corresponding line guide lids 126. The line guide lid 126 may be shaped and/or sized to cover a portion of the link line guide 128. In some embodiments, the link 138 is formed with at least one line guide lid 126. For example, the line guide lid 126 may include a movable feature of the link 138 that is configured to cover a portion of the link line guide 128. In some embodiments, the line guide lid 126 is spring loaded such that when pressed inward towards the service cavity 164 (e.g., by the ridge described above), the portion of the link line guide 128 covered by the line guide lid 126 is now open or exposed allowing the line assembly 106 to be inserted into the link line guide 128. In some embodiments, when the line guide lid 126 is no longer coupled to or in contact with the ridge, the line guide lid 126 springs outward (that is, away from the service cavity 164) to cover the portion of the link line guide 128, thereby securing the line assembly 106 inside the link line guide 128.

In some embodiments, a second end 140 of the link 138 shown in FIG. 3B includes at least one rounded protrusion 144, and a first end 142 of the link 138 shown in FIG. 3A includes at least one indention member 146. The rounded protrusion 144 is configured to engage with the indention member 146 of a neighboring link to align the link 138 with the neighboring link and to limit relative movement of the link 138 and the neighboring link when the links are rigidized by the line assembly 106. In some embodiments, the second end 140 is an end of each corresponding link 138 that is generally facing towards the distal end 148 of the elongated enclosure 102. In such embodiments, the first end 142 is an end of each corresponding link 138 that is generally facing towards the proximal end 134 of the elongated enclosure 102 (that is, facing away from the distal end 148). In some embodiments, the link 138 may include a protruding portion 150 of a pivot feature and a socket portion 152 of the pivot feature of the link 138. In some embodiments, the protruding portion 150 is at the second end 140 while the socket portion 152 is at the first end 142 of the link 138. In some embodiments, the link 138 may be formed with a service cavity 164 to receive a payload. In some embodiments, the protruding portion 150 is configured to engage with the socket portion 152 of the neighboring link to align the link 138 with the neighboring link. In some embodiments, the protruding portion 150 and the socket portion 152 allow the link 138 to pivot up/down while being kept in an alignment with the neighboring link.

FIG. 3C shows a cross-sectional view of the link of FIG. 3A in accordance with some embodiments. In some embodiments, each link 138 may include a backbone channel 154 configured to receive a backbone (not shown). In some embodiments, the backbone may correspond to a piece of plastic or metal sheet sized to fit through the backbone channel 154 and having the same length as the link assembly 104. In some embodiments, the backbone secures each link in the link assembly 104 serially in place. In some embodiments, the link 138 may include one or more first openings 210 located at a first surface of the link 138. The one or more first openings 210 may allow the servicing of the backbone.

Example of a Tip Link

Figure 4A:
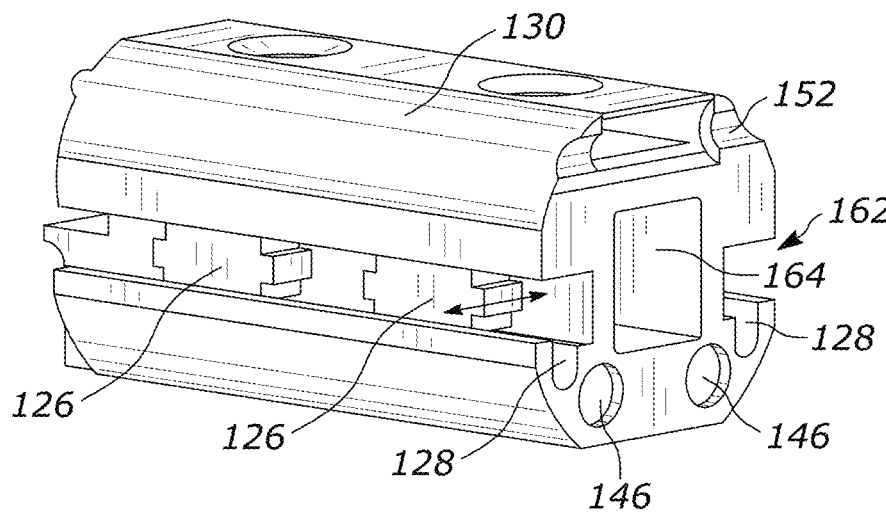
FIG. 4A shows a perspective view at a first end of an exemplary tip link of a link assembly in accordance with some embodiments.
Figure 4B:
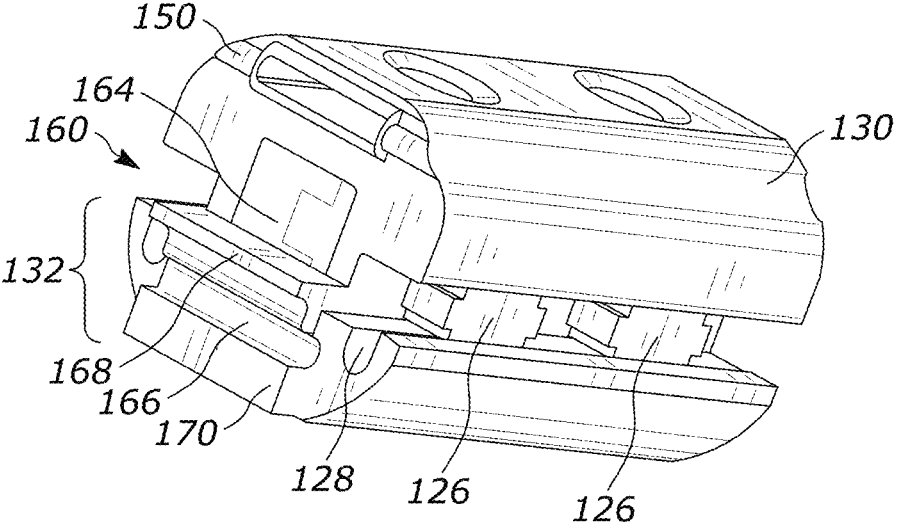
FIG. 4B shows a perspective view of a second end of the tip link of FIG. 4A in accordance with some embodiments.

FIGS. 4A-4B show an exemplary tip link of a link assembly. FIG. 4A shows a perspective view at a first end of an exemplary tip link of a link assembly in accordance with some embodiments. As mentioned, the tip link is at the forward end of the link assembly as the link assembly moves through the enclosure. FIG. 4B shows a perspective view of a second end of the tip link of FIG. 4A in accordance with some embodiments. Some of the elements of links 138 are also present in the tip link 130. For example, the features disposed on a first end 142 of the link 138 are also disposed on a first end 162 of a tip link 130 (e.g., the link line guide 128, the service cavity 164, the socket portion 152, the indention member 146). In some embodiments, the general features of the link 138 are also available in the tip link 130. For example, the line guide lid 126. In some embodiments, features shown in FIG. 3C may also be included with the tip link 130 of FIGS. 4A and 4B.

In some embodiments, instead of having a rounded protrusion 144 similar to the one in the second end 140 of the link 138 as shown in FIG. 3B, the second end 160 of the tip link 130 includes a groove end 132. In some embodiments, the groove end 132 includes an indention member 166, a first ledge member 168, and/or a second ledge member 170. The groove end 132 of the tip link 130 is formed such that when the groove end 132 of the tip link 130 couples and/or contacts the looped end 112 of the line assembly 106, the line assembly 106 is pushed downward causing the line assembly 106 to drop or be inserted into the exposed link line guides 128 of the tip link 130 (as shown in FIG. 11) and subsequent links that are held open by the ridge.

Examples of an Actuator Apparatus

Figure 5A:
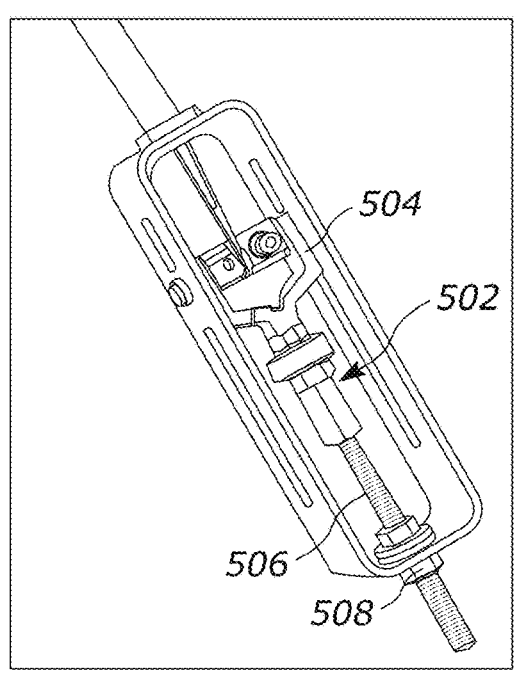
FIGS. 5A, 5B, and 5C show exemplary actuator apparatuses in accordance with some embodiments.
Figure 5B:
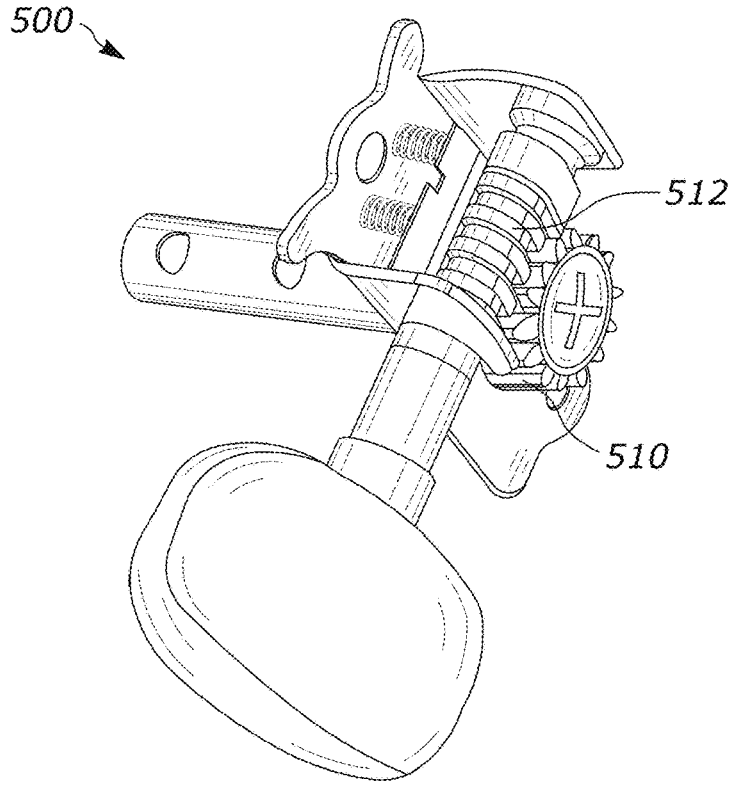
Figure 5C:
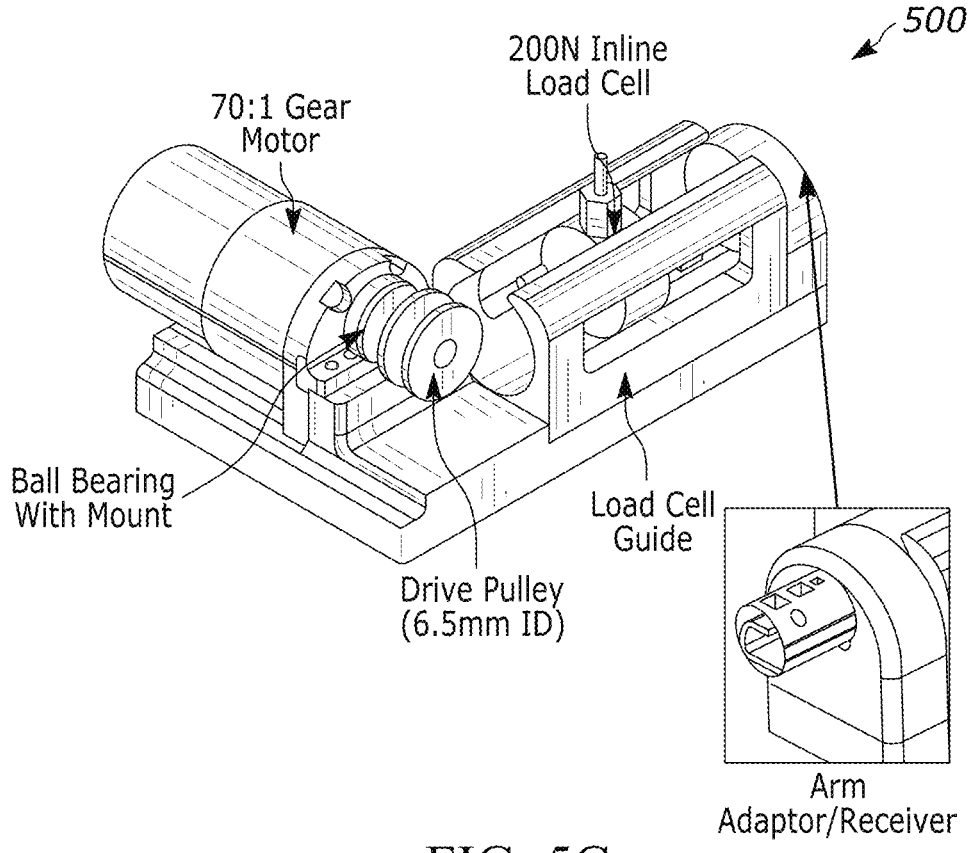

FIGS. 5A-5C show exemplary actuator apparatuses 500 in accordance with some embodiments. The tool 100 of FIG. 1 or FIG. 2A may include an actuator apparatus 500. The purpose of the actuator apparatus 500 is to move the link assembly 104 through the elongated enclosure 102. In some embodiments, the actuator apparatus 500 may include any commercially available actuator apparatus capable of coupling with the line assembly 106 and configured to move the link assembly 104 through the cavity 108 of the elongated enclosure 102 and out of the distal end 148 of the elongated enclosure 102 from a retracted state to an extended state. Alternatively or in addition, the actuator apparatus 500 may include a tensioning device that maintains the line assembly 106 under tension while the plurality of links 138 are in the extended state. In some embodiments, the tension device may apply a tensioning force on the link assembly 104 to maintain the line assembly 106 under tension while the link assembly 104 is in the extended state. For example, the tensioning device can apply tension and/or pulling force on the line assembly 106 to pull a link and a neighboring link tightly together so that the link assembly 104 may form into a shape capable of being maneuvered within an engine during a maintenance operation of a component of the engine.

It will be appreciated that some parts of the actuator apparatus 500 are not shown in FIGS. 5A-5C since an ordinary person skilled in the art would understand the actuator apparatus being discussed, the corresponding parts associated with such an actuator apparatus, and how to couple the actuator apparatus 500 with the line assembly 106 to allow the actuator apparatus to move the link assembly 104 and apply tensioning force on the link assembly 104.

In an illustrative non-limiting example, the actuator apparatus 500 may include a screw/leadscrew based tensioner as shown in FIG. 5A. In some embodiments, the screw/leadscrew based tensioner may include a simple lead screw-based linear sliding mechanism 502 coupled to the line assembly 106. For example, the line assembly 106 may be tied, connected, or coupled to a slider 504 of the screw/leadscrew based tensioner. In some embodiments, as a lead screw 506 of the screw/leadscrew based tensioner gets pulled back by rotating a nut 508 of the screw/leadscrew based tensioner.

In another illustrative non-limiting example, the actuator apparatus 500 may include a worm gear tensioner as shown FIG. 5B. In some embodiments, the worm gear tensioner may include a gear 510 and a worm screw 512. For example, the line assembly 106 may be attached to the gear and the tension can be set by turning the worm screw.

In another illustrative non-limiting example, the actuator apparatus 500 may include a motor-driven active tensioning mechanism as shown in FIG. 5C. In some embodiments, the motor-driven active tensioning mechanism may include a motor (e.g., a gear motor), an inline load cell, a ball bearing with mount, a drive pulley, a load cell guide, and/or a link adaptor/receiver. In an illustrative non-limiting example, the motor-driven active tensioning mechanism includes a motor pulley assembly (e.g., combination of the drive pulley and the motor) with the line assembly 106 attached to the drive pulley. For example, as the motor rotates to wind the line assembly 106 onto the drive pulley, the line assembly 106 may get pulled/tensioned. In some embodiments, the tension can be actively controlled or adjusted by controlling the motor, either using position control (e.g., indirect tension control) or torque control (direct tension control) of the gear motor. In some embodiments, inline tension measurement, such as an inline load cell, can be added to enable closed loop control of tension.

Examples of Tool Accessories

Figure 6:
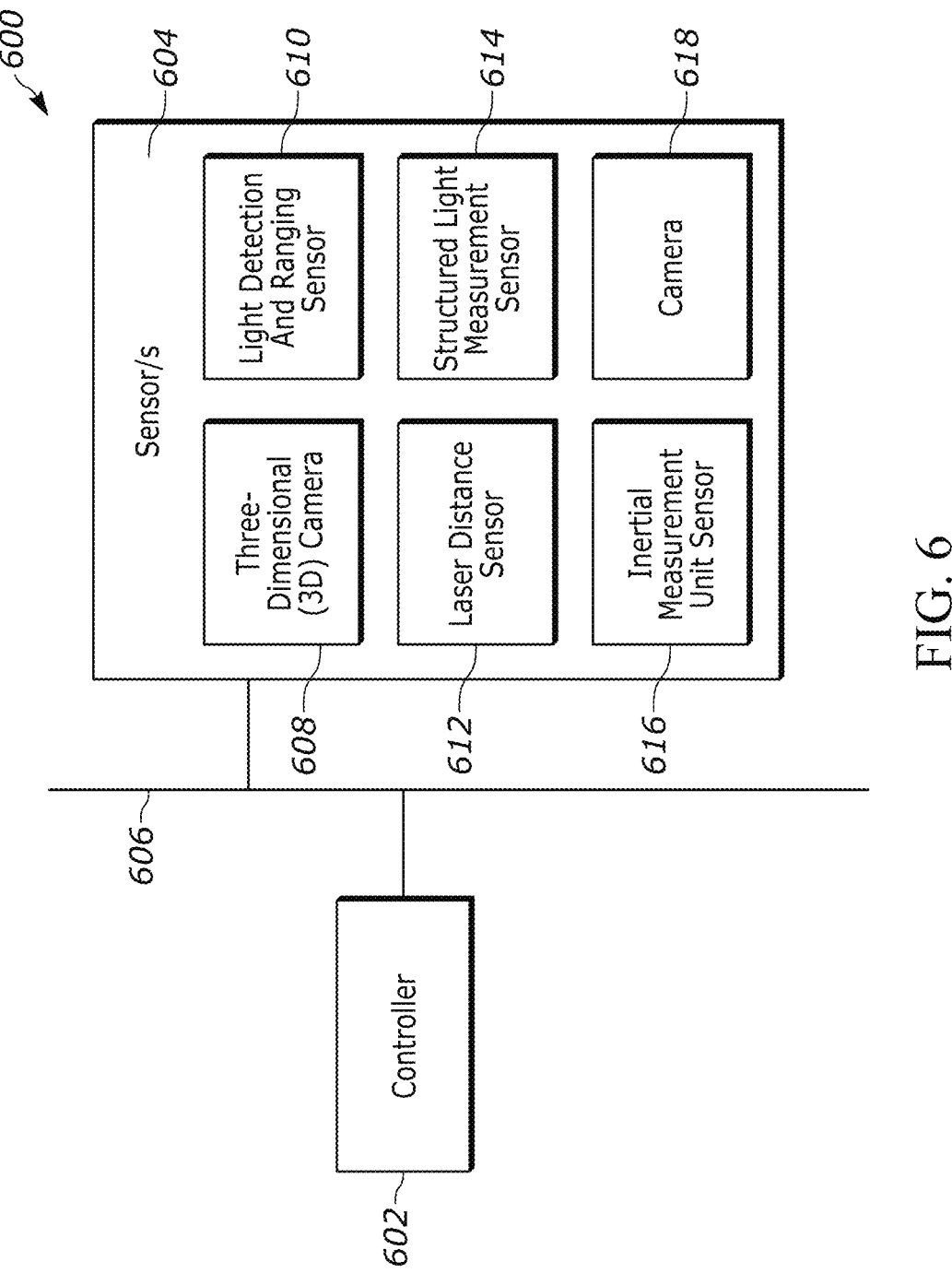
FIG. 6 illustrates a block diagram of tool accessories in accordance with some embodiments.

FIG. 6 illustrates a block diagram of tool accessories 600 in accordance with some embodiments. In some embodiments, one or more tool accessories 600 may be used with the tool 100 described herein. In some embodiments, a controller 602 may be coupled to an actuator apparatus 500 (FIGS. 5A-5C). In some embodiments, the controller 602 may include one or more processors and/or control circuits capable of processing instructions that drive one or more electronic devices. For example, the controller 602 may cause operation of the actuator apparatus 500 to either place the tool 100 in a retracted state or an extended state. In an illustrative non-limiting example, the controller 602 may transmit signal to the actuator apparatus 500 that causes the actuator apparatus 500 to move the link assembly 104 through the cavity 108 of the elongated enclosure 102 and out of the distal end 148 of the elongated enclosure 102 from a retracted state to an extended state. In another illustrative non-limiting example, the controller 602 may transmit signal to the actuator apparatus 500 that causes the actuator apparatus 500 to apply tensioning force to the line assembly 106 causing one or more links of the link assembly 104 to bend during a maintenance operation.

In some embodiments, one or more sensors 604 may be used with the tool 100. For example, a sensor 604 may include at least one of a camera 618, a light detection and ranging (LIDAR) sensor 610, an inertial measurement unit (IMU) sensor 616, a structured light measurement sensor 614, a three-dimensional (3D) stereo camera 608, or a laser distance sensor 612. For example, a user may use at least one of the camera 618, the structured light measurement sensor 614, or a 3D stereo camera 608 to capture an image of a component being inspected and/or repaired. In another example, the IMU sensor 616 may be used to measure acceleration, rotation, and/or velocity of the tool 100. In another example, the user may use the tool 100 with the LIDAR 610 and/or the laser distance sensor 612 to determine depth and/or spatial measurements of cavities, cracks, gaps, and/or spaces inside an engine and/or a component under maintenance. In some embodiments, the controller 602 communicates to at least one sensor 604 via a communication network 606. In some embodiments, the communication network 606 may include Internet and/or a wired network and/or a wireless network. In some embodiments, a sensors may be inserted through a service cavity 164 of the link assembly 104 to aid in inspecting and/or repairing a component within a gas turbine engine. In some embodiments, a payload may be received in the service cavity 164 of the link 138. For example, the payload may include at least one sensor 604 may correspond to a payload received in the service cavity 164.

Example of an End Effector

Figure 7:
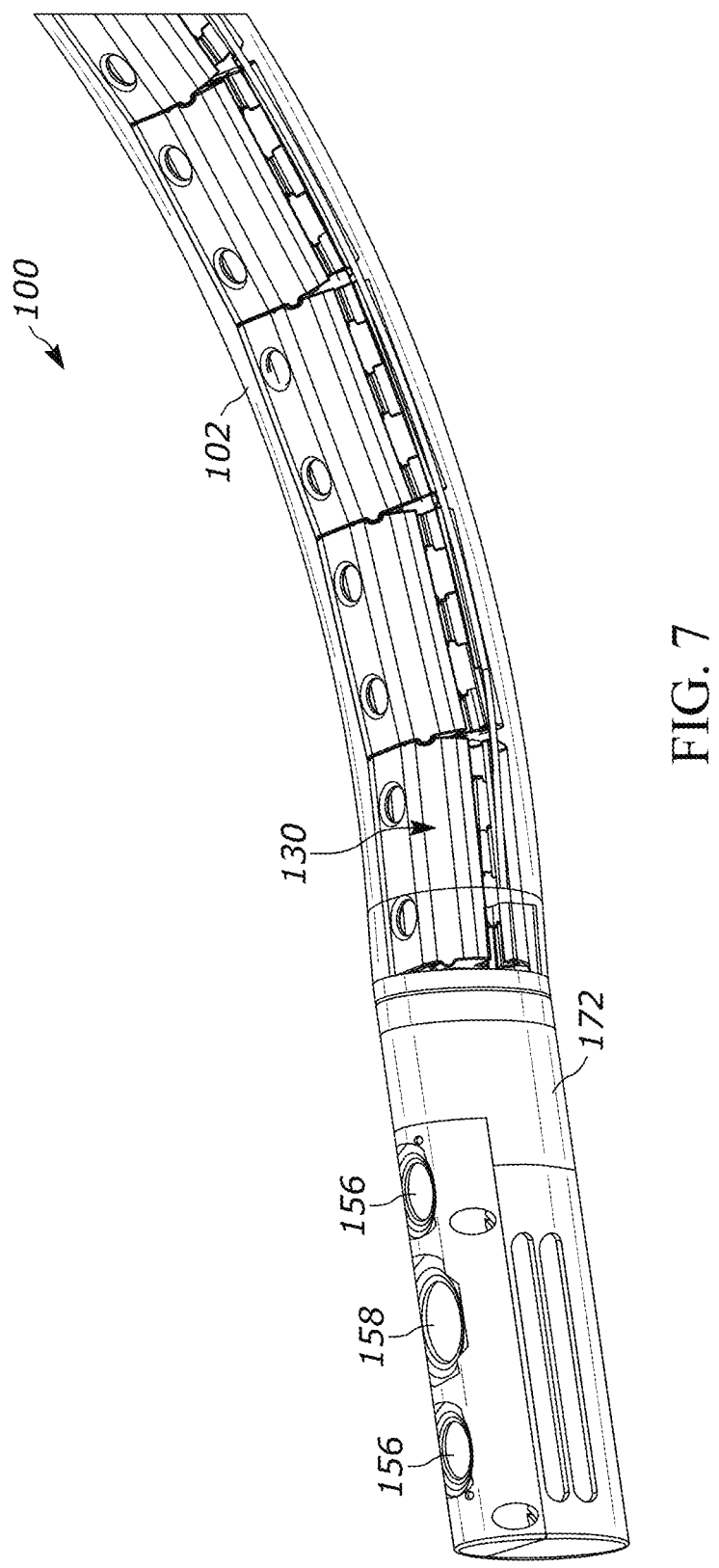
FIG. 7 shows an exemplary end effector coupled to the tool 100 of FIGS. 1 and 2A in accordance with some embodiments.

FIG. 7 shows an exemplary end effector coupled to the tool 100 of FIGS. 1 and 2A in accordance with some embodiments. In some embodiments, the tool 100 may be coupled to an end effector 172. In some embodiments, the end effector 172 may include at least one of a camera 158 with an LED 156 illumination. In some embodiments, the end effector 172 may include at least one of spray tools, a laser, a camera, brushes, a drilling tool, a grinding tool, a light source, a welding tool, a cutting tool a gel dispensing head, or a liquid dispensing head. In some embodiments, the end effector 172 may be one or more fixed and/or detachable accessories to facilitate maintenance (e.g., inspection and/or repair) inside an engine. In some embodiments, the end effector 172 may be attached or coupled to the tip link 130 and stays out of the elongated enclosure 102 as shown in FIG. 7. For example, the end effector 172 may be screwed to, glued, or otherwise attached by some fastening mechanism to the tip link 130.

FIG. 8 shows a flow diagram of an exemplary method 800 for performing maintenance operations on a component within a gas turbine engine in accordance with some embodiments. In some embodiments, one or more steps in the method 800 may be performed by one or more components of the tool 100 described above. For example, the method 800 includes, at step 802, positioning a link assembly in a cavity of an elongated enclosure. In some embodiments, the link assembly being a plurality of links sequentially coupled together and having a tip link at one end. Each of the plurality of links may be formed with a link line guide that is configured to receive a line assembly. Alternatively or in addition, the method 800 may include, at step 804, coupling an end of the line assembly with the tip link of the link assembly. The line assembly may be partially disposed through an enclosure line guide of the elongated enclosure. Alternatively or in addition, the method 800 may include, at step 806, moving the link assembly through the cavity and out of a distal end of the elongated enclosure. Alternatively or in addition, the method 800 may include, at step 808, tensioning links of the plurality of links passed the distal end of the elongated enclosure from a retracted state to an extended state to rigidize the links. In a retracted state, the line assembly may be disposed outside the link line guide of at least one link of the plurality of links. In an extended state, the at least one link of the plurality of links may be disposed outside of the elongated enclosure and the line assembly is inserted within the link line guide of the at least one link.

Further aspects of the present disclosure are provided by the subject matter of the following clauses:

A tool for performing maintenance operations within a gas turbine engine, the tool comprising: a link assembly, the link assembly comprising a plurality of links sequentially coupled together and having a tip link at one end, wherein each of the plurality of links is formed with a link line guide that is configured to receive a line assembly; an elongated enclosure having a cavity and an enclosure line guide, the link assembly being disposed within the cavity, the enclosure line guide including a distal section with a distal opening and a proximal section with a proximal opening; a line assembly inserted through the enclosure line guide and is selectively coupled to the tip link of the link assembly, wherein the line assembly when coupled to the tip link is operated to cause tensioning of links of the plurality of links past a distal end of the elongated enclosure to rigidize the link assembly; and an actuator apparatus coupled to the link assembly and configured to move the link assembly through the cavity and out of the distal end of the elongated enclosure from a retracted state to an extended state, wherein in the retracted state, the line assembly is disposed outside the link line guide of at least one link of the plurality of links, and wherein in the extended state, the at least one link of the plurality of links is disposed outside of the elongated enclosure and the line assembly is inserted within the link line guide of the at least one link.

The tool of any preceding clause further comprising an end effector coupled to the tip link, the end effector including at least one of spray tools, a laser, a camera, a brush, a drilling tool, a grinding tool, a light source, a welding tool, a cutting tool a gel dispensing head, or a liquid dispensing head.

The tool of any preceding clause wherein the actuator apparatus comprises a tensioning device configured to maintain the line assembly under tension while the plurality of links are in the extended state.

The tool of any preceding clause wherein the at least one link comprises at least one line guide lid configured to open to allow insertion of the line assembly into the link line guide and to close to keep the line assembly in the link line guide when the at least one link is outside of the elongated enclosure.

The tool of any preceding clause wherein the at least one line guide lid is spring loaded.

The tool of any preceding clause wherein the elongated enclosure forms a ridge on at least an inner side wall of the elongated enclosure and protruding into the cavity, the ridge being sized and shaped to open the at least one line guide lid allowing insertion of the line assembly into the link line guide as the at least one link is moved out of the elongated enclosure.

The tool of any preceding clause wherein a first location of the enclosure line guide corresponds to a location of the ridge that is tapered towards the proximal section of the enclosure line guide to open the least one at line guide lid allowing insertion of the line assembly into the link line guide as the at least one link is moved out of the elongated enclosure.

The tool of any preceding clause wherein the elongated enclosure forms a ridge on at least an inner side wall of the elongated enclosure and protruding into the cavity, the ridge being sized and shaped to open the at least one line guide lid allowing extraction of the line assembly out of the link line guide as the at least one link is pulled into the elongated enclosure.

The tool of any preceding clause wherein a second location of the enclosure line guide corresponds to a location of the ridge that is tapered towards the distal end of the elongated enclosure to open the at least one line guide lid when the link assembly is retracted to decouple the line assembly from the at least one link.

The tool of any preceding clause wherein the at least one link is formed with a service cavity configured to receive a payload.

The tool of any preceding clause wherein the elongated enclosure is a curved tube.

The tool of any preceding clause wherein a first end of the at least one link comprises at least one rounded protrusion and a second end of the at least one link comprises at least one indention member, wherein the at least one rounded protrusion of the at least one link is configured to engage with at least one indention member of a neighboring link to align the at least one link with the neighboring link and to limit relative movement of the at least one link and the neighboring link when the plurality of links are rigidized by the line assembly.

A method for performing maintenance operations on a component within a gas turbine engine, the method comprising: positioning a link assembly in a cavity of an elongated enclosure, the link assembly being a plurality of links sequentially coupled together and having a tip link at one end, wherein each of the plurality of links is formed with a link line guide that is configured to receive a line assembly; coupling a front end of the line assembly with the tip link of the link assembly, the line assembly partially disposed through an enclosure line guide of the elongated enclosure; moving, by an actuator apparatus coupled to the link assembly, the link assembly through the cavity and out of a distal end of the elongated enclosure; and tensioning the line assembly, by the actuator apparatus, to change a state of links of the plurality of links past the distal end of the elongated enclosure from a retracted state to an extended state to rigidize the links, wherein in the retracted state, the line assembly is disposed outside the link line guide of at least one link of the plurality of links, and wherein in the extended state, the at least one link of the plurality of links is disposed outside of the elongated enclosure and the line assembly is inserted within the link line guide of the at least one link.

The method of any preceding clause further comprising opening at least one line guide lid of the at least one link, by a line insertion feature of a ridge formed on at least an inner side wall of the elongated enclosure and protruding into the cavity, to allow insertion of the line assembly into the link line guide; and closing the at least one line guide lid of the at least one link as the at least one link is moved out of the elongated enclosure.

The method of any preceding clause wherein the line insertion feature corresponds to a location of the ridge that is tapered towards the proximal section of the enclosure line guide.

The method of any preceding clause further comprising opening at least one line guide lid of the at least one link, by a line extraction feature of a ridge formed on at least an inner side wall of the elongated enclosure and protruding into the cavity, to decouple the line assembly from the at least one link when the link assembly is retracted from the elongated enclosure; and closing the at least one line guide lid of the at least one link as the at least one link is moved out of the elongated enclosure.

The method of any preceding clause wherein the line extraction feature corresponds to a location of the ridge that is tapered towards the distal end of the elongated enclosure to open the at least one line guide lid when the link assembly is retracted to decouple the line assembly from the at least one link as the at least one link is pulled into the elongated enclosure.

The method of any preceding clause further comprising coupling an end effector to the tip link, the end effector including at least one of spray tools, a laser, a camera, brushes, a drilling tool, a grinding tool, a light source, a welding tool, a cutting tool a gel dispensing head, or a liquid dispensing head.

The method of any preceding clause wherein the at least one link is formed with a service cavity configured to receive a payload.

The method of any preceding clause wherein the elongated enclosure is a curved tube.

Those skilled in the art will recognize that a wide variety of other modifications, alterations, and combinations can also be made with respect to the above described embodiments without departing from the scope of this disclosure, and that such modifications, alterations, and combinations are to be viewed as being within the ambit of the inventive concept.

The invention claimed is:

1. A tool for performing maintenance operations within a gas turbine engine, the tool comprising:
    a link assembly, the link assembly comprising a plurality of links sequentially coupled together and having a tip link at one end, wherein each of the plurality of links is formed with a link line guide that is configured to receive a line assembly;
    an elongated enclosure having a cavity and an enclosure line guide, the link assembly being disposed within the cavity, the enclosure line guide including a distal section with a distal opening and a proximal section with a proximal opening;
    wherein the line assembly is inserted through the enclosure line guide and is selectively coupled to the tip link of the link assembly, and wherein the line assembly, when coupled to the tip link, is operated to cause tensioning of links of the plurality of links past a distal end of the elongated enclosure to rigidize the link assembly; and
    an actuator apparatus coupled to the link assembly and configured to move the link assembly through the cavity and out of the distal end of the elongated enclosure from a retracted state to an extended state,
    wherein in the retracted state, the line assembly is disposed outside the link line guide of at least one link of the plurality of links, and
    wherein in the extended state, the at least one link of the plurality of links is disposed outside of the elongated enclosure and the line assembly is inserted within the link line guide of the at least one link.

2. The tool of claim 1, further comprising an end effector coupled to the tip link, the end effector including at least one of a spray tool, a laser, a camera, a brush, a drilling tool, a grinding tool, a light source, a welding tool, a cutting tool, a gel dispensing head, or a liquid dispensing head.

3. The tool of claim 1, wherein the actuator apparatus comprises a tensioning device configured to maintain the line assembly under tension while the plurality of links are in the extended state.

4. The tool of claim 1, wherein the at least one link comprises at least one line guide lid configured to open to allow insertion of the line assembly into the link line guide and to close to keep the line assembly in the link line guide when the at least one link is outside of the elongated enclosure.

5. The tool of claim 4, wherein the at least one line guide lid is spring loaded.

6. The tool of claim 4, wherein the elongated enclosure forms a ridge on at least an inner side wall of the elongated enclosure and protruding into the cavity, the ridge being sized and shaped to open the at least one line guide lid allowing insertion of the line assembly into the link line guide as the at least one link is moved out of the elongated enclosure.

7. The tool of claim 6, wherein a first location of the enclosure line guide corresponds to a location of the ridge that is tapered towards the proximal section of the enclosure line guide to open the least one at line guide lid allowing insertion of the line assembly into the link line guide as the at least one link is moved out of the elongated enclosure.

8. The tool of claim 4, wherein the elongated enclosure forms a ridge on at least an inner side wall of the elongated enclosure and protruding into the cavity, the ridge being sized and shaped to open the at least one line guide lid allowing extraction of the line assembly out of the link line guide as the at least one link is pulled into the elongated enclosure.

9. The tool of claim 8, wherein a second location of the enclosure line guide corresponds to a location of the ridge that is tapered towards the distal end of the elongated enclosure to open the at least one line guide lid when the link assembly is retracted to decouple the line assembly from the at least one link.

10. The tool of claim 1, wherein the at least one link is formed with a service cavity configured to receive a payload.

11. The tool of claim 1, wherein the elongated enclosure is a curved tube.

12. The tool of claim 1, wherein a first end of the at least one link comprises at least one rounded protrusion and a second end of the at least one link comprises at least one indention member, wherein the at least one rounded protrusion of the at least one link is configured to engage with at least one indention member of a neighboring link to align the at least one link with the neighboring link and to limit relative movement of the at least one link and the neighboring link when the plurality of links are rigidized by the line assembly.

13. A method for performing maintenance operations on a component within a gas turbine engine, the method comprising:

positioning a link assembly in a cavity of an elongated enclosure, the link assembly being a plurality of links sequentially coupled together and having a tip link at one end, wherein each of the plurality of links is formed with a link line guide that is configured to receive a line assembly;

coupling a looped end of the line assembly with the tip link of the link assembly, the line assembly partially disposed through an enclosure line guide of the elongated enclosure;

moving, by an actuator apparatus coupled to the link assembly, the link assembly through the cavity and out of a distal end of the elongated enclosure; and tensioning the line assembly, by the actuator apparatus, to change a state of links of the plurality of links past the distal end of the elongated enclosure from a retracted state to an extended state to rigidize the links, wherein when in the retracted state, the line assembly is disposed outside the link line guide of at least one link of the plurality of links, and wherein when in the extended state, the at least one link of the plurality of links is disposed outside of the elongated enclosure and the line assembly is inserted within the link line guide of the at least one link.

14. The method of claim 13, further comprising opening at least one line guide lid of the at least one link, at a first location of the enclosure line guide, to allow insertion of the line assembly into the link line guide; and closing the at least one line guide lid of the at least one link as the at least one link is moved out of the elongated enclosure.

15. The method of claim 14, wherein the first location corresponds to a location of a ridge that is tapered towards a proximal section of the enclosure line guide.

16. The method of claim 13, further comprising opening at least one line guide lid of the at least one link, at a second location of the enclosure line guide, to decouple the line assembly from the at least one link when the link assembly is retracted from the elongated enclosure; and closing the at least one line guide lid of the at least one link as the at least one link is moved out of the elongated enclosure.

17. The method of claim 16, wherein the second location corresponds to a location of a ridge that is tapered towards the distal end of the elongated enclosure to open the at least one line guide lid when the link assembly is retracted to decouple the line assembly from the at least one link as the at least one link is pulled into the elongated enclosure.

18. The method of claim 13, further comprising coupling an end effector to the tip link, the end effector including at least one of spray tools, a laser, a camera, brushes, a drilling tool, a grinding tool, a light source, a welding tool, a cutting tool a gel dispensing head, or a liquid dispensing head.

19. The method of claim 13, wherein the at least one link is formed with a service cavity configured to receive a payload.

20. The method of claim 13, wherein the elongated enclosure is a curved tube.

* * * * *